(12) United States Patent
Ai et al.

(10) Patent No.: US 10,456,625 B2
(45) Date of Patent: Oct. 29, 2019

(54) SPORTING APPARATUS AND CONTROLLING METHOD THEREOF

(71) Applicant: DELTA ELECTRONICS, INC., Taoyuan (TW)

(72) Inventors: Tsu-Hua Ai, Taoyuan (TW); Chih-Yang Chen, Taoyuan (TW); Yen-Hung Wu, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 135 days.

(21) Appl. No.: 15/247,354

(22) Filed: Aug. 25, 2016

(65) Prior Publication Data

US 2016/0367859 A1 Dec. 22, 2016

Related U.S. Application Data

(63) Continuation-in-part of application No. 13/538,506, filed on Jun. 29, 2012, now abandoned.

(Continued)

(51) Int. Cl.
*A63B 24/00* (2006.01)
*A63B 21/005* (2006.01)
(Continued)

(52) U.S. Cl.
CPC ...... *A63B 24/0087* (2013.01); *A63B 21/0053* (2013.01); *A63B 21/0055* (2015.10);
(Continued)

(58) Field of Classification Search
CPC ........ A63B 24/0062; A63B 2024/0093; A63B 2220/30; A63B 2225/50; A63B 2024/0025; A63B 21/00181; A63B 21/00192; A63B 21/0052; A63B 21/0058; A63B 2220/20; A63B 2220/22; A63B 2220/40;
(Continued)

(56) References Cited

U.S. PATENT DOCUMENTS 4,278,095 A * 7/1981 Lapeyre ................. A61B 5/024
 482/7
4,749,181 A * 6/1988 Pittaway ................ A63B 22/02
 482/54
(Continued)

*Primary Examiner* — Loan B Jimenez
*Assistant Examiner* — Shila Jalalzadeh Abyaneh
(74) *Attorney, Agent, or Firm* — Muncy, Geissler, Olds & Lowe, P.C.

(57) ABSTRACT

A sporting apparatus comprises a structure body, an endless belt, an electricity generating unit, a position sensing unit and a modulation unit for continuously outputting electricity as the sporting apparatus is continuously operated. The electricity generating unit transforms kinetic energy, which is transmitted from the endless belt, into electric power. The position sensing unit senses a position of a user on the endless belt so as to generate a sensing signal. The modulation unit includes a DC/AC inverter, a current sensing element, an inductor and a semiconductor switch with a controller. The current sensing element senses an armature current outputted from the electricity generating unit and outputs a signal to the controller. The controller controls the duty ratio of the semiconductor switch to control the armature current, so that the armature current is adjusted according to the sensing signal for controlling the rotation speed of the endless belt.

16 Claims, 11 Drawing Sheets

Related U.S. Application Data

(60) Provisional application No. 61/504,012, filed on Jul. 1, 2011.

(51) Int. Cl.
  *A63B 22/02* (2006.01)
  *F03G 5/00* (2006.01)
  *F03G 5/02* (2006.01)
  *A63B 22/00* (2006.01)
  *H01F 7/16* (2006.01)

(52) U.S. Cl.
  CPC ...... *A63B 22/0242* (2013.01); *A63B 22/0285* (2013.01); *F03G 5/00* (2013.01); *F03G 5/025* (2013.01); *H01F 7/1607* (2013.01); *A63B 22/0023* (2013.01); *A63B 2024/0093* (2013.01); *A63B 2220/13* (2013.01); *A63B 2220/54* (2013.01); *A63B 2220/89* (2013.01); *A63B 2230/625* (2013.01)

(58) Field of Classification Search
  CPC .......... A63B 2220/80; A63B 2220/803; A63B 2230/42; A63B 22/02; A63B 23/0405; A63B 24/00; A63B 24/0087; A63B 69/0028; A63B 22/0242; A63B 21/0055; A63B 21/0053; A63B 2220/54; A63B 22/0023; A63B 2230/625; A63B 2220/89; A63B 2220/13; A61H 2203/0443; A61H 2201/50; A61H 2201/5064; F03G 5/025; F03G 5/00; H01F 7/1607
  See application file for complete search history.

(56) References Cited

U.S. PATENT DOCUMENTS

| | | | | |
|---|---|---|---|---|
| 5,368,532 | A * | 11/1994 | Farnet | A63B 22/02 482/5 |
| 5,650,709 | A * | 7/1997 | Rotunda | H02M 7/53875 318/802 |
| 6,157,175 | A | 12/2000 | Morinigo | |
| 6,302,826 | B1 | 10/2001 | Lee | |
| 6,443,875 | B1 * | 9/2002 | Golen, Jr. | A63B 22/02 482/51 |
| 7,094,184 | B1 | 8/2006 | Chen et al. | |
| 8,007,408 | B1 * | 8/2011 | Moran | A63B 22/0023 482/2 |
| 2007/0161466 | A1 | 7/2007 | Oglesby | |
| 2009/0023556 | A1 * | 1/2009 | Daly | A63B 22/0235 482/9 |
| 2009/0054207 | A1 * | 2/2009 | Lin | A63B 21/0053 482/2 |
| 2010/0210418 | A1 * | 8/2010 | Park | A63B 21/0053 482/4 |
| 2010/0279819 | A1 * | 11/2010 | Ono | A63B 22/0235 482/2 |
| 2012/0007367 | A1 * | 1/2012 | Chang | A63B 21/00178 290/1 R |
| 2012/0010048 | A1 * | 1/2012 | Bayerlein | A63B 21/0053 482/2 |
| 2014/0011642 | A1 * | 1/2014 | Astilean | A63B 22/02 482/54 |

\* cited by examiner

SPORTING APPARATUS AND CONTROLLING METHOD THEREOF

CROSS REFERENCE TO RELATED APPLICATIONS

This Non-provisional application is a Continuation-In-Part (CIP) of an earlier filed, pending, application, having application Ser. No. 13/538,506 and filed on Jun. 29, 2012, which claims priority to U.S. provisional patent application with Ser. No. 61/504,012 filed on Jul. 1, 2011. This and all other extrinsic materials discussed herein are incorporated by reference in their entirety.

BACKGROUND OF THE INVENTION

Field of Invention

The present invention relates to a sporting apparatus and, in particular, to a sporting apparatus having a modulation unit for controlling the rotation speed.

Related Art

More and more people are busy in their works and social activities, so they do not have time to do exercise. Consequently, many kinds of sporting apparatuses are invented for these busy people. For example, a running machine 1 as shown in FIG. 1A allows the user to do running exercise anytime and anywhere.

The running machine 1 includes a motor 11 and an endless belt 12. The motor 11 can drive the endless belt 12 to rotate, so that the user can run on the rotating endless belt 12. This allows the user to work out at home or gym.

However, the running machine 1 must be powered on to enable the motor 11 to drive the endless belt 12 to rotate, and the running machine 1 is high power consumption. In addition, when the rotation speed of the endless belt 12 is set already, the user can only passively run following the set rotation speed of the endless belt 12. Since the running machine 1 can not adjust the rotation speed of the endless belt 12 according to the position of the user on the endless belt 12, the user may fall down and get hurt if the running speed of the user does not compete with the rotation speed of the endless belt 12.

FIG. 1B shows a running machine disclosed by Jae-sang Park in US Patent Publication No. US20100210418 A1. The running machine of FIG. 1B utilizes a mechanical adjustment to change the rotation speed of the endless belt. For example, when the user 1000 runs too fast or too slow so as to position in front of or behind the reference position $X_0$ of the belt 5000, the exerciser detecting portion 3000 of the running machine can detects the variation ($X_0$, $X_r$, $\Delta X$) of the positions of the user on the belt. Then, the signal of the position variation is transmitted to the control portion 7000 as shown in FIG. 1C. The control portion 7000 outputs a control signal according to the position variation to control the motor driving portion 6000 to further adjust the power supply portion 2500 to increase or decrease the rotation speed of the driving motor 4000, thereby changing the rotation speed of the belt 5000.

However, this mechanical control mechanism for directly increasing or decreasing the rotation speed of the motor by controlling the power supply portion has longer response time in controlling the rotation speed of the belt. In other words, this control mechanism has a drawback of poor response speed to the position variation of the user. Besides, the running machine disclosed by Park only performs the electricity generation function as the rotation speed of the motor decreases, and the electricity generation function of the running machine does not work in other situations.

Therefore, it is a subject of the invention to provide a sporting apparatus and a control method thereof that do not need the external power for driving, is capable of continuously performing the electricity generation function to function as an electricity generator, and can adjust the rotation speed of the endless belt with shorter response time according to the position of the user on the endless belt so as to prevent the user from getting hurt.

SUMMARY OF THE INVENTION

In view of the foregoing, an objective of the invention discloses a sporting apparatus and a control method thereof that do not need the external power for system driving, is capable of continuously performing the electricity generation function to function as an electricity generator, and can adjust the rotation speed of the endless belt with shorter response time according to the position of the user on the endless belt so as to prevent the user from getting hurt.

To achieve the above objective, the present invention discloses a sporting apparatus comprising a structure body, an endless belt, an electricity generating unit, a position sensing unit and a modulation unit for continuously outputting electricity as the sporting apparatus is continuously operated. The endless belt is disposed on the structure body. The electricity generating unit is disposed in the structure body and transforms kinetic energy, which is transmitted from the endless belt, into electric power. The position sensing unit is disposed in the structure body and senses a position of a user on the endless belt to generate a sensing signal. The modulation unit is electrically connected with the electricity generating unit and the position sensing unit for receiving the sensing signal. The modulation unit includes a DC/AC inverter, a current sensing element, an inductor and a semiconductor switch with a controller. The current sensing element senses an armature current outputted from the electricity generating unit and outputs a signal to the controller. The controller controls the duty ratio of the semiconductor switch to control the armature current, so that the armature current is adjusted according to the sensing signal for controlling the rotation speed of the endless belt.

In one embodiment of the invention, the sporting apparatus further comprises a transmission mechanism disposed in the structure body and connected with the endless belt and the electricity generating unit.

In one embodiment of the invention, when the current sensing element senses the armature current flowing through the inductor, the controller controls the duty ratio of the semiconductor switch to control the armature current.

In one embodiment of the invention, when the current sensing element senses the current flowing through the conducted semiconductor switch, the controller controls the duty ratio of the semiconductor switch to control the armature current.

In one embodiment of the invention, the modulation unit adjusts the armature current to change the rotation speed of the endless belt, so that the user is kept on a specific position of the endless belt.

In one embodiment of the invention, the modulation unit controls the armature current by pulse width modulation.

In one embodiment of the invention, the sporting apparatus further comprises at least a piezo-electric element disposed in the endless belt.

In one embodiment of the invention, the sporting apparatus further comprises a start auxiliary unit, which is electrically connected with the electricity generating unit and provides a start voltage.

To achieve the above objective, the present invention also discloses a control method applied to a sporting apparatus. The sporting apparatus includes an endless belt, and the endless belt rotates to drive an electricity generating unit to generate an armature current. The method includes the following steps of: sensing a position of a user on the endless belt so as to generate a sensing signal, adjusting the armature current according to the sensing signal, and controlling a rotation speed of the endless belt according to the armature current.

In one embodiment of the invention, the step of sensing the position of the user on the endless belt so as to generate the sensing signal is performed by a position sensing unit. The step of adjusting the armature current according to the sensing signal is performed by a modulation unit. The modulation unit controls the armature current by pulse width modulation; otherwise, the modulation unit controls the armature current by modulating an output power of the electricity generating unit. Moreover, the modulation unit alters the armature current so as to change the rotation speed of the endless belt, so that the user is kept on a specific position of the endless belt. The rotation speed of the endless belt increases when the armature current decreases; on the contrary, the rotation speed of the endless belt decreases when the armature current increases.

As mentioned above, the sporting apparatus of the invention is configured with an electricity generating unit for transforming kinetic energy transmitted from the endless belt into electric power, so that the sporting apparatus can continuously perform the electricity generating function. The position sensing unit senses a position of a user on the endless belt so as to generate a sensing signal. The modulation unit receives the sensing signal, and the current sensing element senses the armature current outputted from the electricity generating unit and outputs a signal to the controller. The controller controls the duty ratio of the semiconductor switch to control the armature current, so that the armature current is adjusted according to the sensing signal for controlling the rotation speed of the endless belt. Therefore, the sporting apparatus does not need the external power and can adjust the rotation speed of the endless belt according to the position of the user on the endless belt with the shorter response time of the semiconductor switch. Accordingly, the user can be kept on the specific position of the endless belt so as to protect the user from falling down and getting hurt due to that the running speed of the user does not compete with the rotation speed of the endless belt. As a result, in the sporting apparatus and control method thereof of the invention, the external power is not necessary and the user can be protected from falling down and getting hurt.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
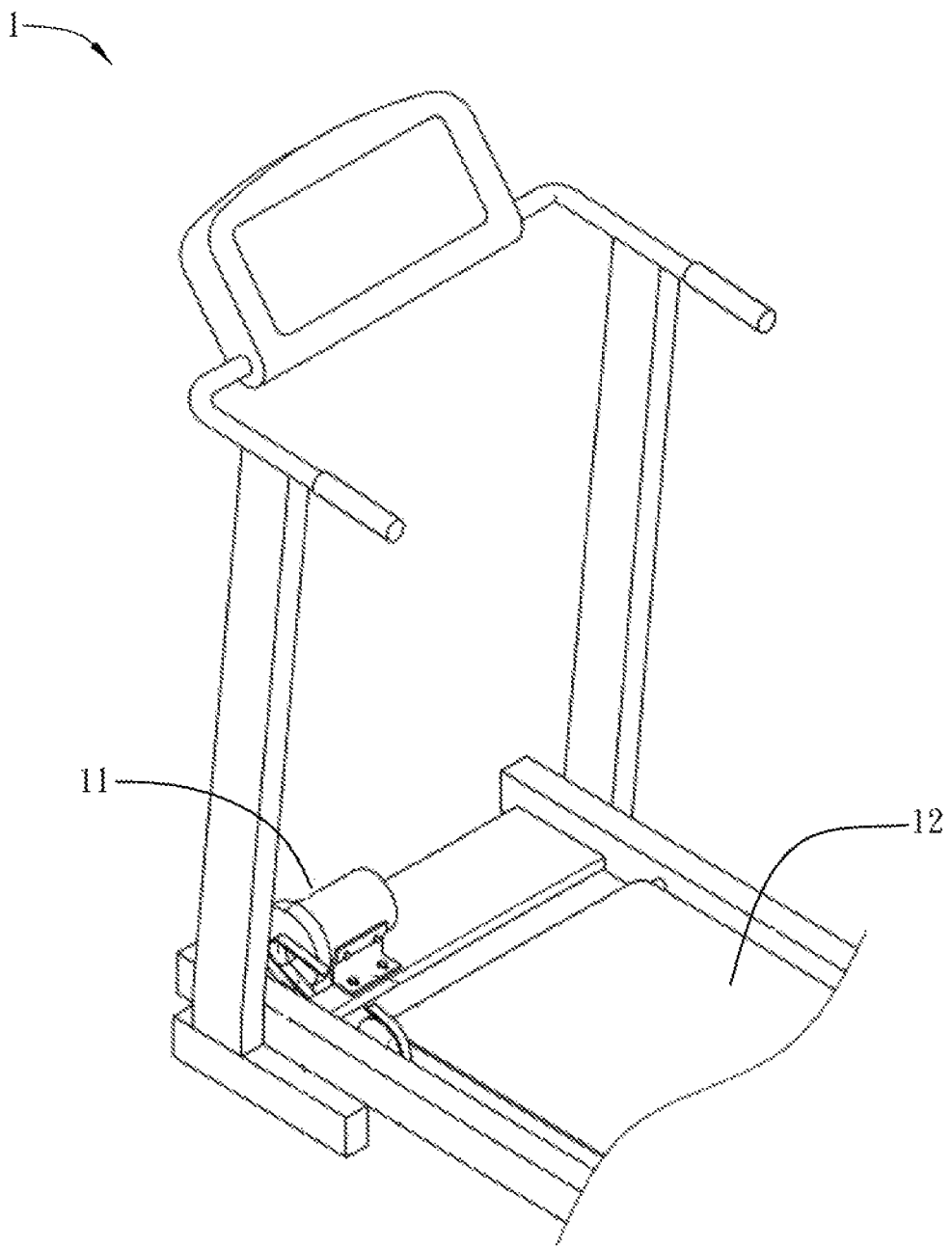
FIG. 1A is a schematic diagram showing a part of the conventional running machine.
Figure 1B:
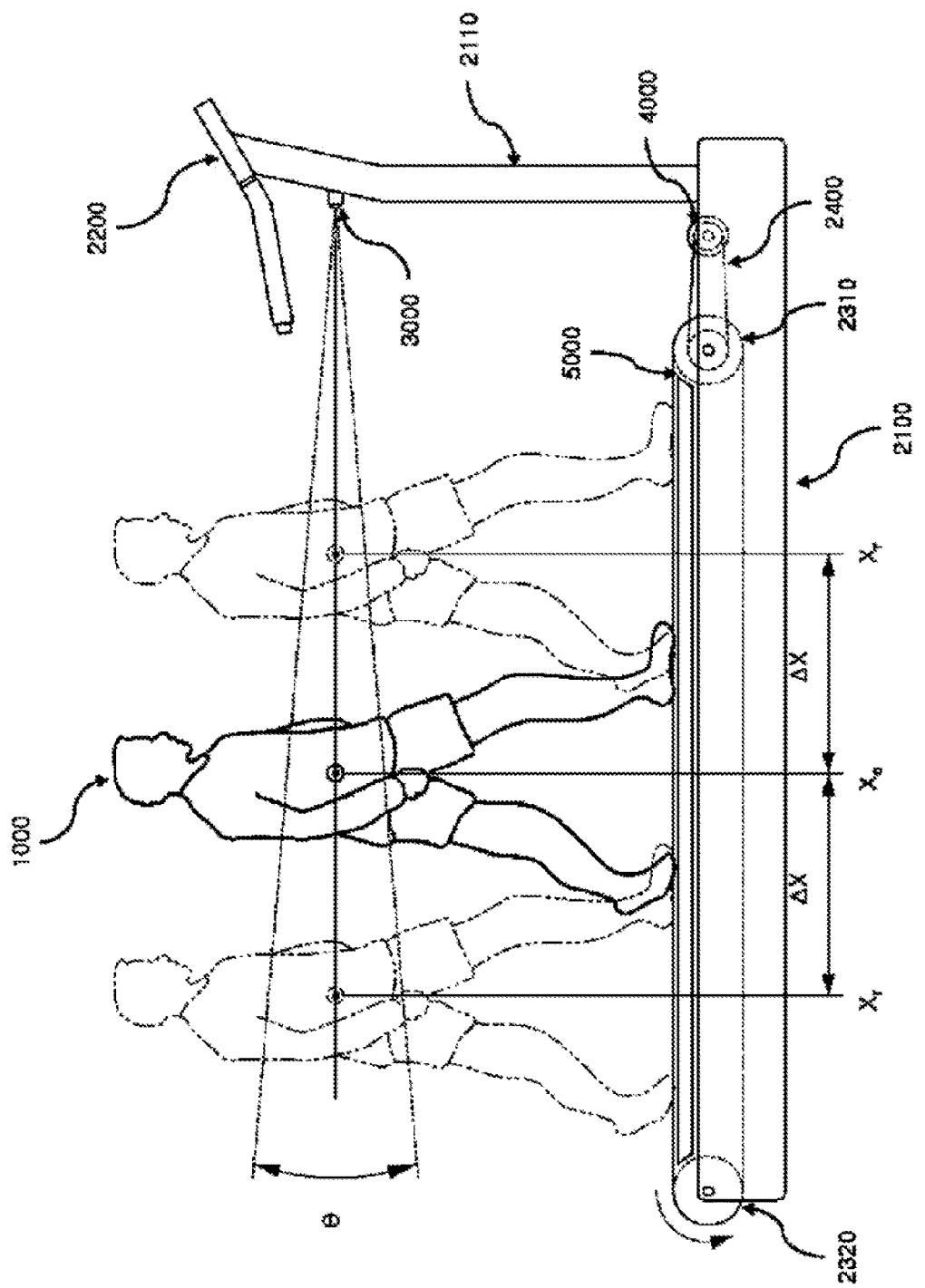
FIG. 1B is a schematic diagram showing another conventional running machine.
Figure 1C:
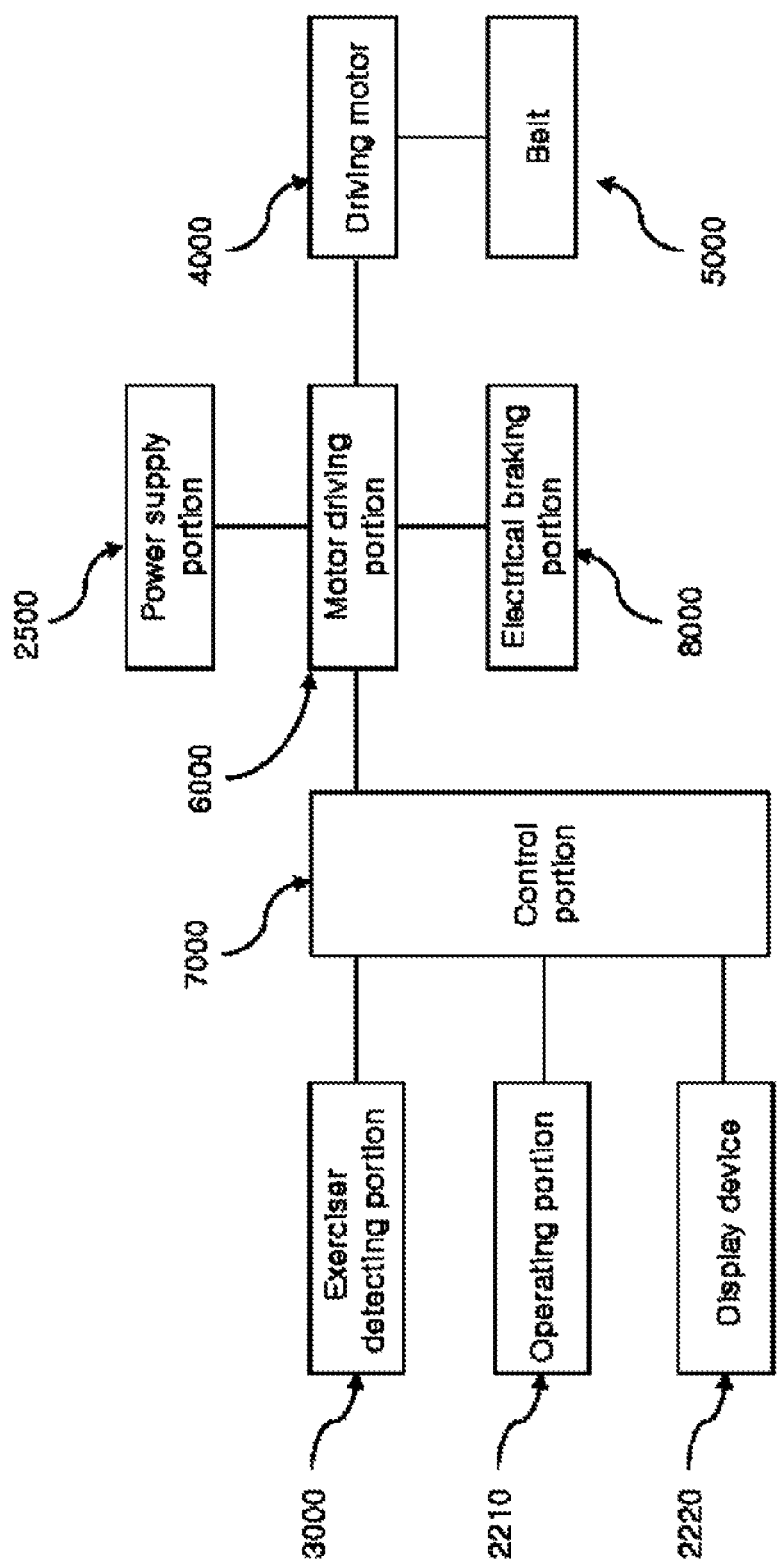
FIG. 1C is a functional block diagram of the running machine of FIG. 1B.
Figure 2:
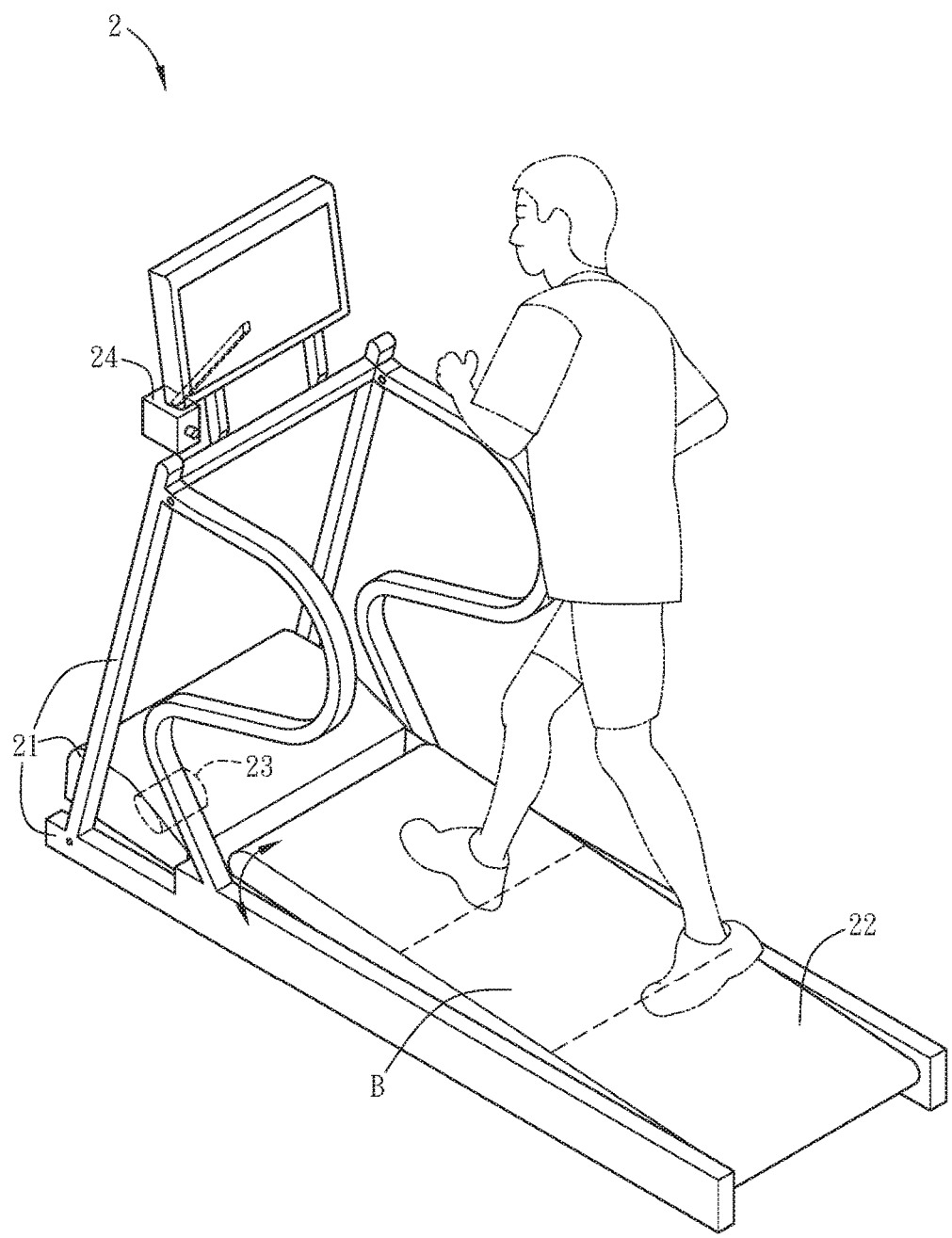
FIG. 2 is a schematic diagram showing a sporting apparatus according to an embodiment of the invention.
Figure 3:
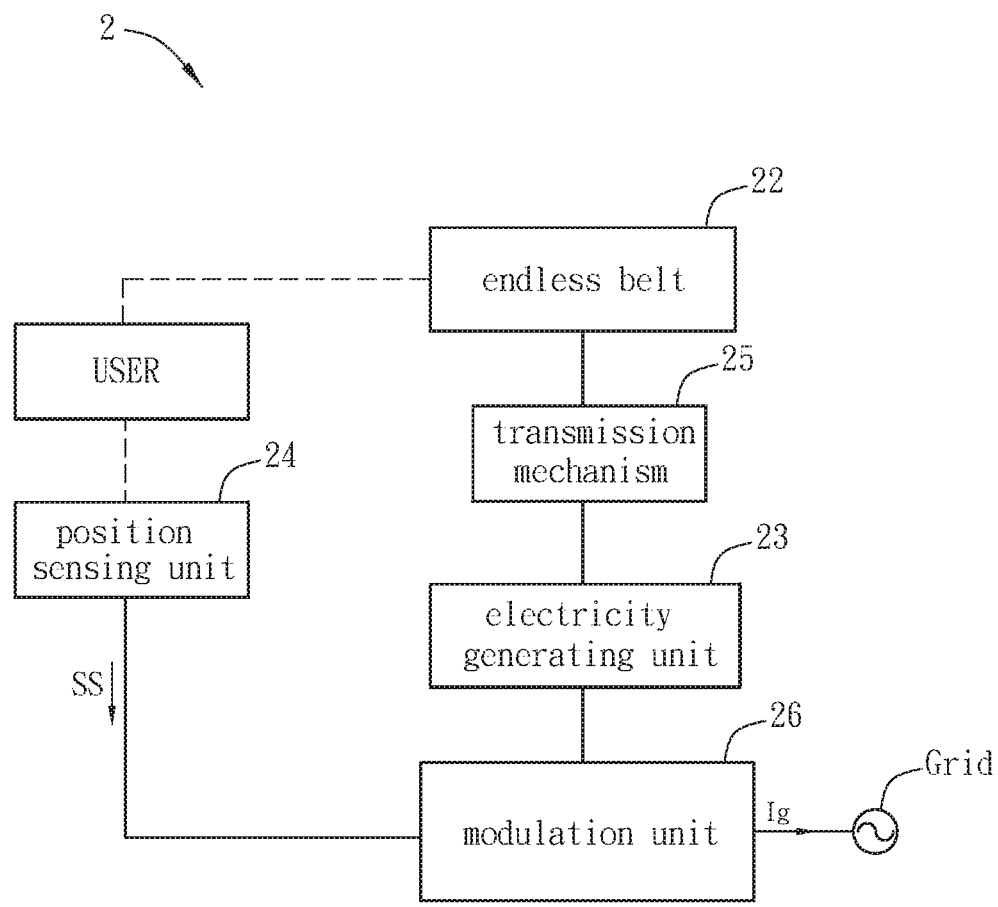
FIG. 3 is a block diagram of the sporting apparatus according to the embodiment of the invention.

A sporting apparatus 2 according to an embodiment of the invention will be described hereinafter with reference to FIGS. 2 and 3, wherein FIG. 2 is a schematic diagram showing the sporting apparatus 2, and FIG. 3 is a block diagram of the sporting apparatus 2.

The sporting apparatus 2 comprises a structure body 21, an endless belt 22, an electricity generating unit 23, and a position sensing unit 24. Moreover, the sporting apparatus 2 further comprises a transmission mechanism 25 and a modulation unit 26. To be noted, the sporting apparatus 2 of the invention is not the conventional running machine, so that the external power is not necessary for the sporting apparatus 2. In the embodiment, the kinetic energy generated by a user can rotate the endless belt 22 so as to enable the electricity generating unit 23 of the sporting apparatus 2 to generate electricity. In addition, the electricity generated by the electricity generating unit 23 can be applied to drive elements of the sporting apparatus 2 or to charge an energy storage device. Besides, it can also be applied to a load or be sold to the power company. However, the applications of the generated electricity are not limited to this embodiment.

The endless belt 22 is disposed on the structure body 21 through two rotation shafts and has a tilt angle for providing a gradually increased or decreased slope, so that it can rotate relative to the structure body 21 and provide a simulated running situation in a planar road or a mountain. In other words, the endless belt 22 is disposed on the structure body 21 with a tilt-angle adjustable function, and the structure body 21 stands still while the endless belt 22 rotates. In this case, the endless belt 22 is a rubber belt for example. Of course, it can also be a track. Besides, since the endless belt 22 has a tilt angle, the weight of the user can apply a gravitational component parallel to the endless belt 22 so as to help to run the endless belt 22, thereby improving the electricity generation efficiency of the electricity generating unit 23.

The electricity generating unit 23 is disposed in the structure body 21, and it is used to transform kinetic energy, which is transmitted from the endless belt 22, into electric power. The electricity generating unit 23 can be, for example but not limited to, a permanent-magnet generator, an induction generator, or a DC generator (including brush and commutator).

The transmission mechanism 25 is disposed in the structure body 21 and connected with the endless belt 22 and the electricity generating unit 23. Thus, the transmission mechanism 25 can transmit kinetic energy of the rotating endless belt 22 to the electricity generating unit 23. In other words, when the user runs on the endless belt 22, the endless belt 22 is rotated and the transmission mechanism 25 can transform kinetic energy of the rotating endless belt 22 into torque and then transmit the torque to the electricity generating unit 23. Thus, the electricity generating unit 23 can generate electricity. In addition, since the electricity generating unit 23 is a generator, an armature current Ia of the electricity generating unit 23 is in positive proportion with the counter torque of the electricity generating unit 23. When the armature current Ia of the electricity generating unit 23 is altered, the counter torque of the electricity generating unit 23 is relatively changed in proportion. Accordingly, the transmission mechanism 25 can also change the rotation speed of the endless belt 22 depending on the counter torque variation of the electricity generating unit 23. In other words, when the counter torque of the electricity generating unit 23 is altered, the transmission mechanism 25 can change the rotation speed of the endless belt 22 according to the counter torque variation of the electricity generating unit 23. In this embodiment, the transmission mechanism 25 is, for example but not limited to, a set of planetary gears, a gear box, or a set of belts.

The position sensing unit 24 is disposed in the structure body 21 and senses a position of the user on the endless belt 22 so as to generate a sensing signal SS. For example, the position sensing unit 24 may comprise an ultrasonic sensor, an infrared sensor, or a piezo-electric sensor. In this embodiment, the position sensing unit 24 is an ultrasonic sensor. In addition, the armature current Ia of the electricity generating unit 23 is adjusted according to the sensing signal SS. Once the armature current Ia changes, the counter torque of the electricity generating unit 23 is relatively changed so as to control the rotation speed of the endless belt 22.

The modulation unit 26 is electrically connected with the electricity generating unit 23 and the position sensing unit 24, and the modulation unit 26 controls the armature current Ia according to the sensing signal SS. When the modulation unit 26 alters the armature current Ia, the counter torque of the electricity generating unit 23 and the rotation speed of the endless belt 22 are relatively changed. Thus, the user is kept on a specific position of the endless belt 22. Besides, the modulation unit 26 can modulate the armature current Ia outputted from the electricity generating unit 23 and then generates an output current Ig to the utility electric grid. Grid can receive the output current Ig for the following electricity distribution actions. In this embodiment, the specific position of the endless belt 22 represents the center region B of the endless belt 22 in FIG. 2.

In other words, if the running speed of the user does not compete with the rotation speed of the endless belt 22 (e.g. when the running speed of the user is faster, or the rotation speed of the endless belt 22 is slower), the user may step forward and be located in front of the region B of the endless belt 22 as shown in FIG. 2. In this case, the position sensing unit 24 detects that the user is located in front of the region B of the endless belt 22, so that it outputs the sensing signal SS to the modulation unit 26. Then, the modulation unit 26 modulates the armature current Ia of the electricity generating unit 23 according to the sensing signal SS. Herein, the modulation unit 26 controls to decrease the armature current Ia. Moreover, since the armature current Ia is in positive proportion with the counter torque, the counter torque of the electricity generating unit 23 is relatively decreased. The decrease of the counter torque of the electricity generating unit 23 achieves the effect of reducing the load of the running endless belt 22, which means that the user can feel an easier level while running on the endless belt 22. Consequently, the rotation speed of the endless belt 22 is increased, so that the user is shifted back to the region B of the endless belt 22.

Alternatively, when the running speed of the user is slower, or the rotation speed of the endless belt 22 is faster, the user may step backward and be located in back of the region B of the endless belt 22 as shown in FIG. 2. In this case, the position sensing unit 24 detects that the user is located in back of the region B of the endless belt 22, so that it outputs the sensing signal SS to the modulation unit 26. Then, the modulation unit 26 modulates the armature current Ia of the electricity generating unit 23 according to the sensing signal SS. Herein, the modulation unit 26 controls to increase the armature current Ia, so that the counter torque of the electricity generating unit 23 is relatively increased too. The increase of the counter torque of the electricity generating unit 23 achieves the effect of increasing the load of the endless belt 22 that means the user can feel a tougher level while running on the endless belt 22. Consequently, the rotation speed of the endless belt 22 is decreased, so that the user is shifted forward to the center region B of the endless belt 22. As a result, when the running speed of the user is not compete with the rotation speed of the endless belt 22, it is possible to dynamically adjust to shift the user to the region B of the endless belt 22.

The procedures of using the modulation unit 26 to adjust the armature current Ia of the electricity generating unit 23 will be described hereinafter with reference to FIGS. 4A to 4D. FIGS. 4A to 4D are block diagrams of several aspects of parts of the sporting apparatus 2 for using the modulation unit 26 to adjust the armature current Ia. To make the descriptions more clear, the blocks of the structure body 21, the endless belt 22, and the transmission mechanism 25 are omitted in FIGS. 4A to 4D. In this embodiment, the electricity generated by the electricity generating unit 23 is applied to the utility electric grid for the following electricity distribution actions for example.

Figure 4A:
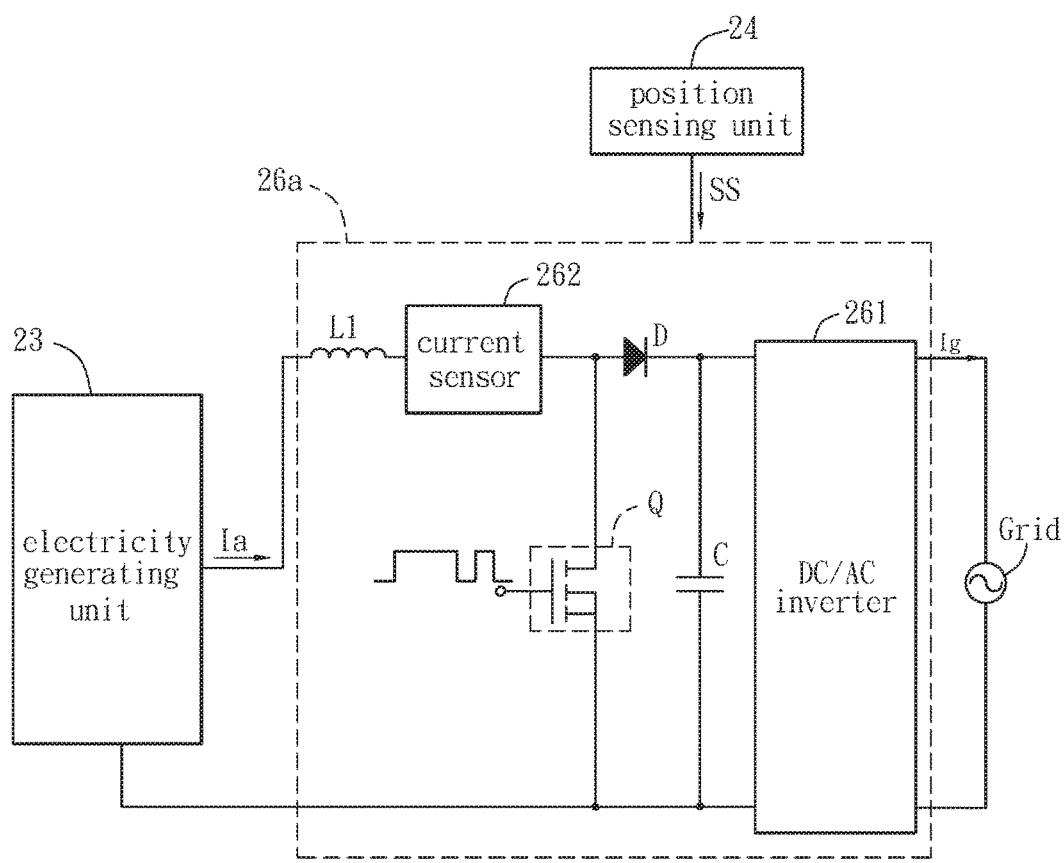
FIGS. 4A to 4D are block diagrams of several aspects of parts of the sporting apparatus according to the embodiment of the invention.

Referring to FIG. 4A, the modulation unit 26a comprises a DC/AC inverter 261, a current sensor 262, a semiconductor switch Q, and an inductance L1. In this embodiment, the modulation unit 26a can have a current modulation function due to the current-controlled DC/AC inverter 261. In other embodiments, the DC/AC inverter 261 can be replaced by another kind of modulation component, and this invention is not limited. When receiving the sensing signal SS generated from the position sensing unit 24, the modulation unit 26a can use the DC/AC inverter 261, the current sensor 262 and the semiconductor switch Q to directly control the armature current Ia. In this embodiment, the electricity generating unit 23 can be a generator and the inductance L1 can be an additional configured component or substituted by the leakage inductance of the generator. In addition, if the output of the modulation unit 26a is applied to a pure resistor, the DC/AC inverter 261 can be omitted.

The current sensor 262 can sense the current flowing through the inductance L1, which is the armature current Ia, and output a signal to the controller (not shown in FIG. 4A) of the modulation unit 26a, so that the controller can control the duty ratio of the semiconductor switch Q. The duty ratio of the semiconductor switch Q is controlled by pulse width modulation so as to control the armature current Ia. In other words, the duty ratio of the semiconductor switch Q is controlled by pulse width modulation, so that the armature current Ia is controlled.

For instance, if the user steps backward and is located in back of the region B of the endless belt 22 (see FIG. 2), the position sensing unit 24 outputs the sensing signal SS to the modulation unit 26a for increasing the armature current Ia. In this case, the current sensor 262 determines that the current flowing through the inductance L1 is low, so the current sensor 262 outputs a signal to the controller of the modulation unit 26a. Accordingly, the controller of the modulation unit 26a can control the duty ratio of the semiconductor switch Q for increasing the turn-on period of the semiconductor switch Q. Accordingly, the current flowing through inductance L1 (the armature current Ia) can be increased. Consequently, the counter torque of the electricity generating unit 23 is increased too, so that the rotation speed of the endless belt 22 decreases. This can automatically shift the user forward to the region B of the endless belt 22 (see FIG. 2).

The modulation unit 26a modulates the armature current Ia outputted from the electricity generating unit 23, and then outputs an output current Ig to the utility electric grid by DC/AC inverter 261 for performing the following electricity distribution actions.

Figure 4B:
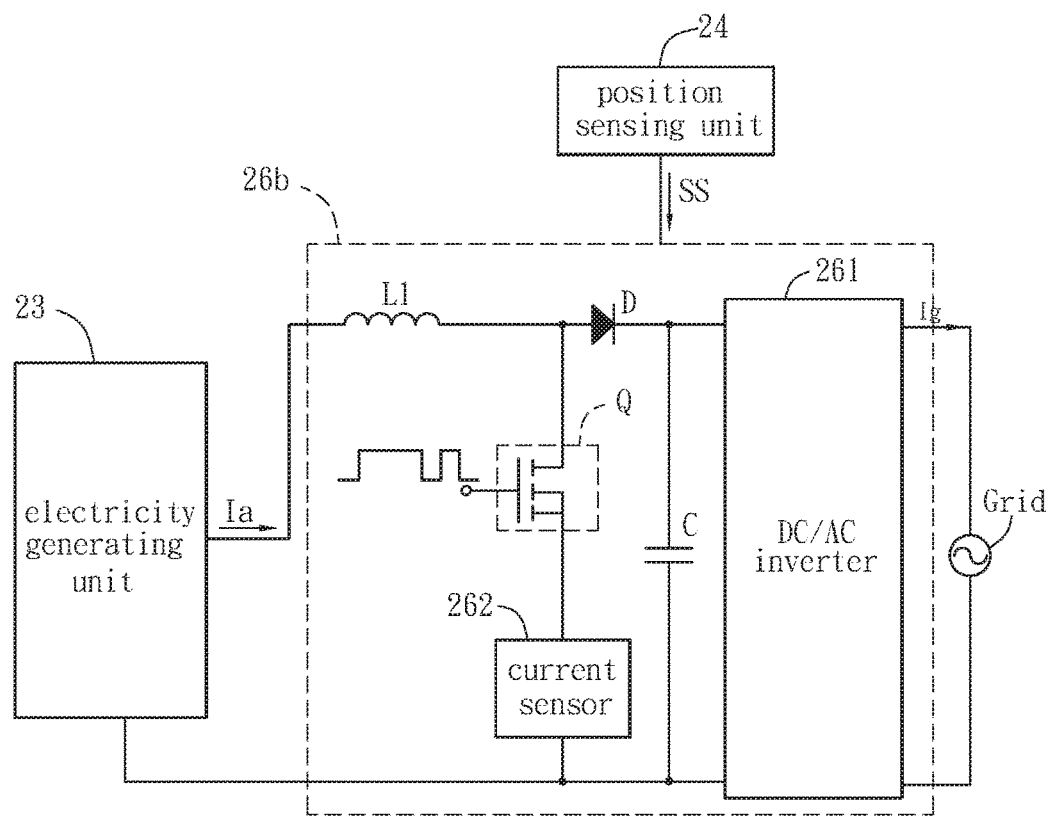

Referring to FIG. 4B, the current sensor 262 of the modulation unit 26b is disposed at another location different from that shown in FIG. 4A. In this case, the current sensor 262 senses the current flowing through the semiconductor switch Q and then outputs a signal to the controller (not shown in FIG. 4B) of the modulation unit 26b, so that the controller can control the duty ratio of the semiconductor switch Q. In other words, the current sensor 262 detects the current value of the semiconductor switch Q during the turn-on period of the semiconductor switch Q. This detected current value also represents the current flowing through the inductance L1. Similarly, this aspect can also control the armature current Ia as described in the previous aspect of FIG. 4A.

Figure 4C:
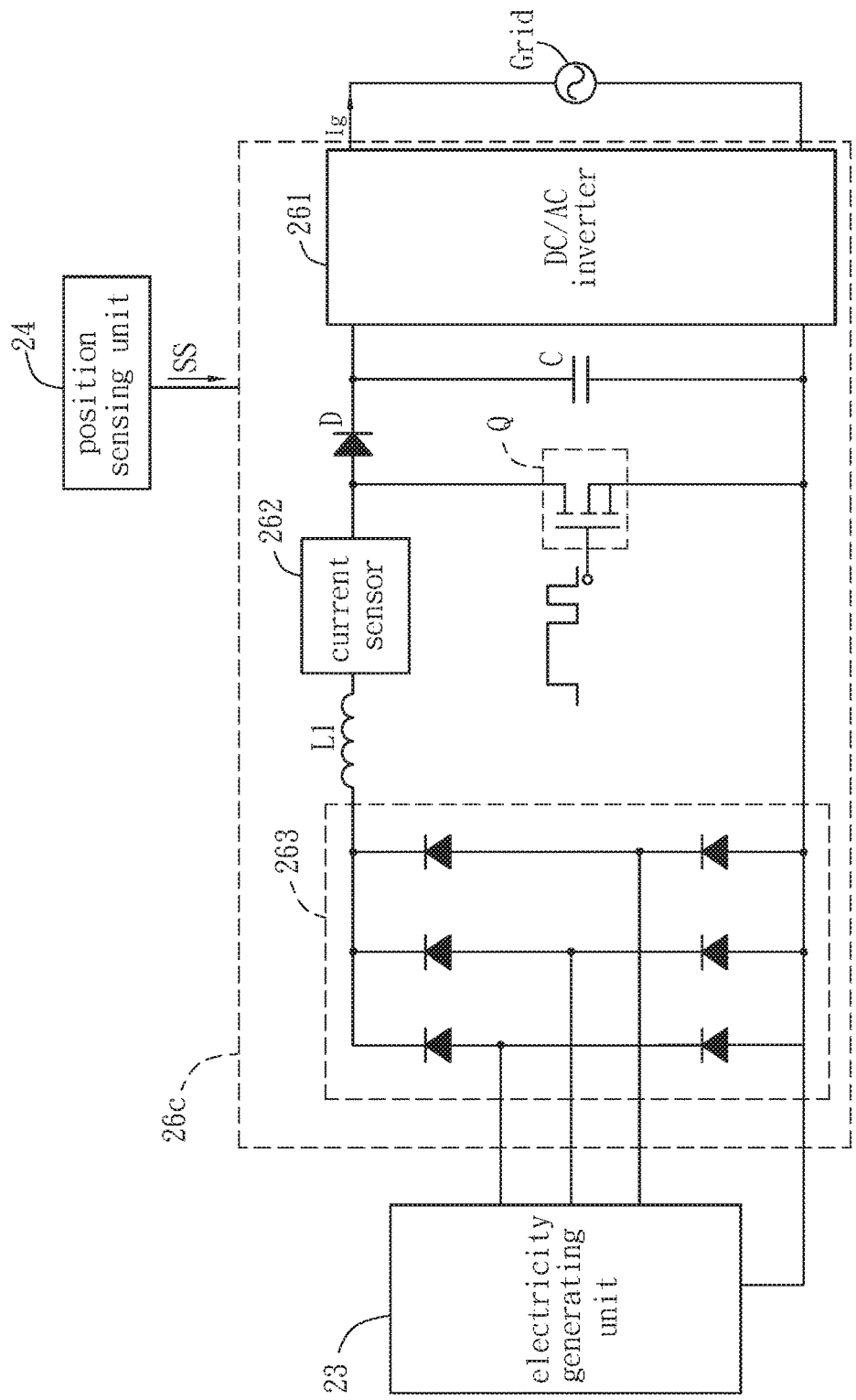

Moreover, if the electricity generating unit 23 is a three-phase generator, the outputted armature current Ia is a three-phase current. Referring to FIG. 4C, the modulation unit 26c may further include a three-phase full-bridge rectifying unit 263, which is composed of six diodes. In addition, the output of the electricity generating unit 23 is rectified by the three-phase full-bridge rectifying unit 263 in advance.

Figure 4D:
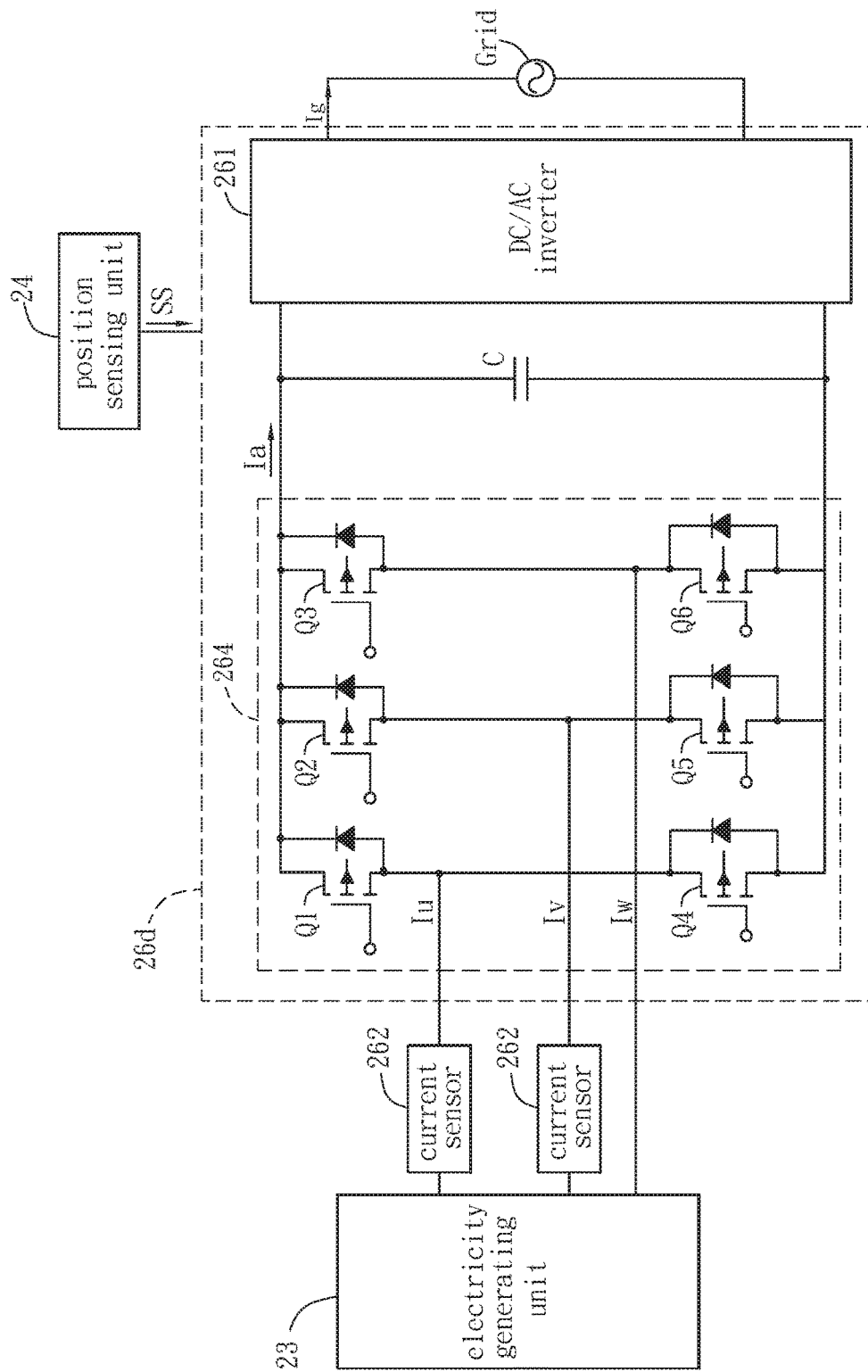

The three-phase full-bridge rectifying unit 263 and the semiconductor switch Q can be integrated for both rectifying and controlling the armature current Ia. Referring to FIG. 4D, the functions of the three-phase full-bridge rectifying unit 263, the diode D and the semiconductor switch Q of FIG. 4C are integrated as a rectify-control unit 264 of FIG. 4D. In this case, the duty ratio of the semiconductor switches Q1 to Q6 are separately controlled by different pulse width modulations, so that the rectifying and modulating of the armature current Ia can be both achieved. In addition, as shown in FIG. 4D, the leakage inductance of the electricity generating unit 23 is used to substitute the inductance L1. Otherwise, it is possible to partially integrate the semiconductor switches Q with the diodes as shown in FIG. 4C. For example, the upper three diodes of the three-phase full-bridge rectifying unit 263 may perform the rectifying function, while the lower three diodes thereof are integrated with the semiconductor switches Q for both rectifying and modulating of the armature current Ia (not shown). In addition, the currents Iu, Iv and Iw outputted from the electricity generating unit 23 are in three-phase balance, so the sum of the currents Iu, Iv and Iw is equal to zero (Iu+Iv+Iw=0). Thus, only two current sensors 262 are needed and configured at any two phases outputted from the electricity generating unit 23 for measuring two of the currents, and the current of the residual one phase can be obtained by calculation. For example, as shown in FIG. 4D, after two current sensors 262 sense the currents Iu and Iv outputted from the electricity generating unit 23, the current Iw of the residual phase can be obtained by calculation.

Similarly, as shown in FIGS. 4B to 4D, the modulation unit 26b, 26c or 26d modulates the armature current Ia outputted from the electricity generating unit 23, and then outputs an output current Ig to the utility electric grid by a DC/AC inverter 261 for performing the following electricity distribution actions.

In addition, the sporting apparatus 2 may further comprise at least one piezo-electric element (not shown), which is disposed on the endless belt 22. The configuration of the piezo-electric element can transform the instant impact as the user steps on the endless belt 22 into voltage. The piezo-electric element can utilize the piezo-electric effect to transform mechanical energy into electricity. In other words, the piezo-electric element can generate extra electricity due to the piezo-electric effect, so that the total generated electricity of the sporting apparatus 2 can be increased.

Figure 5:
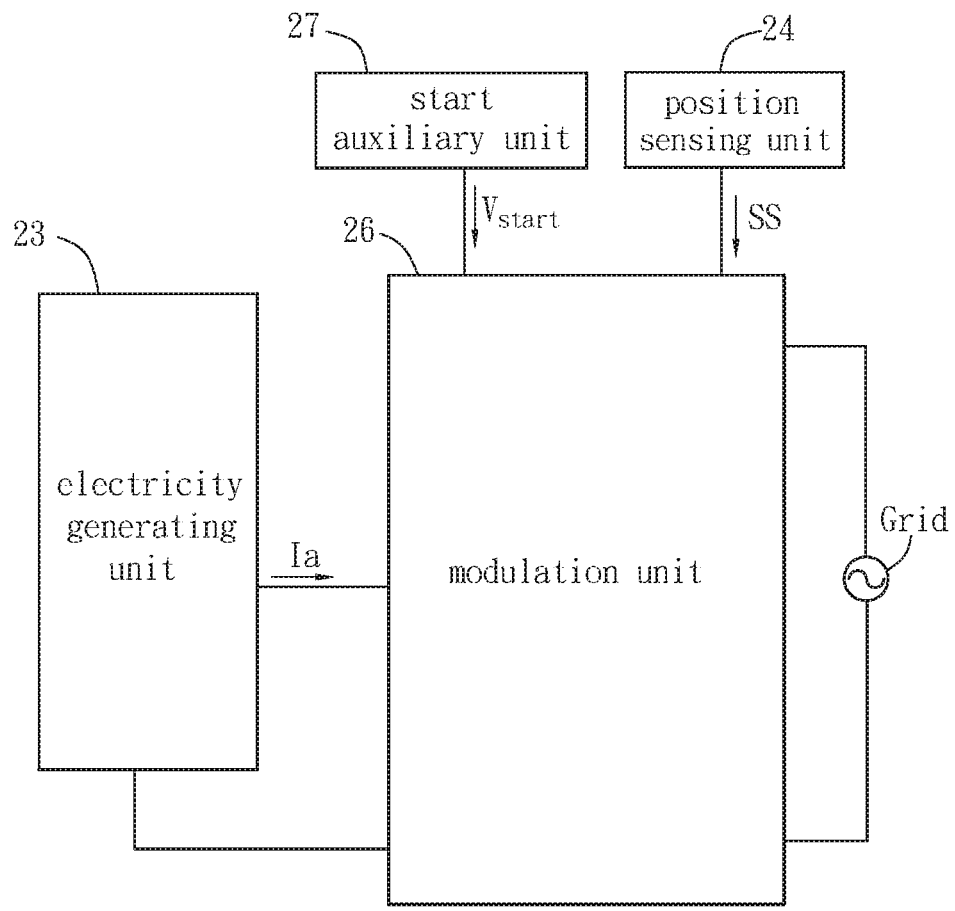
FIG. 5 is a block diagram of another aspect of parts of the sporting apparatus according to the embodiment of the invention.

FIG. 5 is a block diagram of another aspect of parts of the sporting apparatus 2 according to the embodiment of the invention. To make the descriptions more clear, the blocks of the structure body 21, the endless belt 22, and the transmission mechanism 25 are also omitted in FIG. 5.

The sporting apparatus 2 may further include a start auxiliary unit 27, which is electrically connected with the modulation unit 26. The start auxiliary unit 27 provides a start voltage $V_{start}$ before the sporting apparatus 2 is started, so that the armature current Ia can be inhibited while the sporting apparatus 2 is just started and/or is in a low speed. This configuration can decrease the counter torque of the electricity generating unit 23, so that the user can easily drive the endless belt 22 to start rotating. The start voltage $V_{start}$ can be provided from the utility power, battery, or other energy storage device. In addition, it is possible to enable the start auxiliary function by using a sensor to detect the user and/or by pressing a button before the running exercise.

Before the user starts to run on the sporting apparatus 2, the electricity generating unit 23 is controlled to stop providing electricity to the load, and a capacitor of the modulation unit 26 can be charged to a value of the start voltage $V_{start}$. When the user starts to run on the sporting apparatus 2, the electricity generating unit 23 is in low speed so that the generated electricity is lower than the start voltage $V_{start}$ of the capacitor. In this case, the electricity generating unit 23 does not output the armature current Ia, so that the counter torque of the electricity generating unit 23 is not induced. Accordingly, the user can feel that the load for running on the endless belt 22 is lower, so the user can easily drive the endless belt 22 to rotate. After the endless belt 22 is rotated, the electricity generating unit 23 starts to output the electricity to the load.

In other aspects, the electricity generating unit 23 can be used as a start motor (not shown). In more specific, when the user starts to run on the sporting apparatus 2, the current is generated and flows into the electricity generating unit 23 so as to drive the electricity generating unit 23 to rotate. Accordingly, the endless belt 22 is driven to rotate. This configuration can also make the user feel it is easy to run on the endless belt 22.

Figure 6:
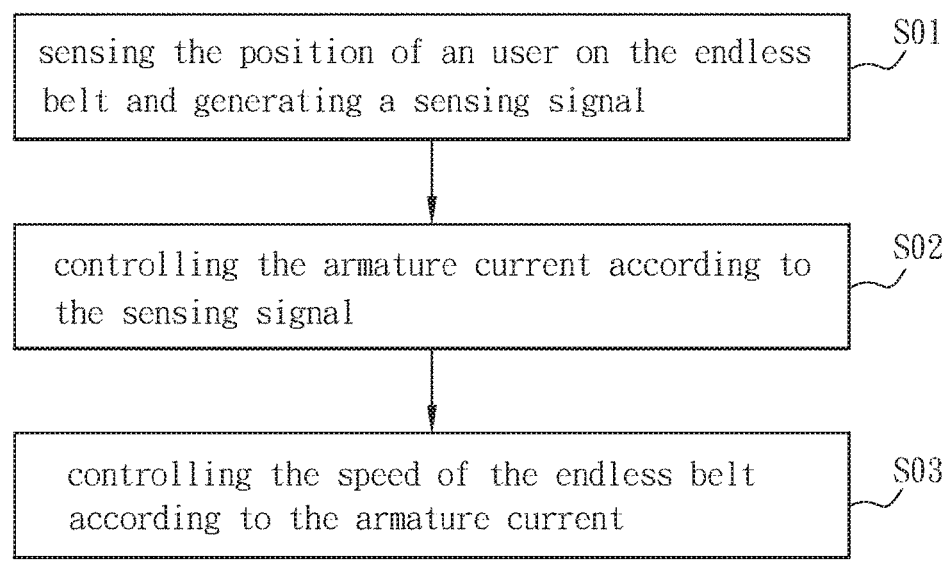
FIG. 6 is a flow chart of a control method of the sporting apparatus according to the embodiment of the invention.

FIG. 6 is a flow chart of a control method of the sporting apparatus 2 according to the embodiment of the invention.

The control method of the sporting apparatus 2 includes the following steps of: sensing a position of a user on the endless belt 22 so as to generate a sensing signal SS (step S01), adjusting the armature current Ia according to the sensing signal SS (step S02), and controlling a rotation speed of the endless belt 22 according to the armature current Ia (step S03). In this embodiment, the step S01 of sensing the position of the user on the endless belt 22 so as to generate the sensing signal SS is performed by a position sensing unit 24. The step S02 of adjusting the armature current Ia according to the sensing signal SS is performed by a modulation unit 26. Accordingly, the rotation speed of the endless belt 22 can be changed so as to keep the user at a specific position on the endless belt 22. In addition, the rotation speed of the endless belt 22 increases when the armature current Ia decreases; on the contrary, the rotation speed of the endless belt 22 decreases when the armature current Ia increases.

The other elements of the sporting apparatus 2 and their technical features are described hereinabove, so the detailed description thereof is omitted.

In summary, the sporting apparatus of the invention is configured with an electricity generating unit for transforming kinetic energy transmitted from the endless belt into electric power, so that the sporting apparatus can continuously perform the electricity generating function. The position sensing unit senses a position of a user on the endless belt so as to generate a sensing signal. The modulation unit receives the sensing signal, and the current sensing element senses the armature current outputted from the electricity generating unit and outputs a signal to the controller. The controller controls the duty ratio of the semiconductor switch to control the armature current, so that the armature current is adjusted according to the sensing signal for controlling the rotation speed of the endless belt. Therefore, the sporting apparatus does not need the external power and can adjust the rotation speed of the endless belt according to the position of the user on the endless belt with the shorter response time of the semiconductor switch. Accordingly, the user can be kept on the specific position of the endless belt so as to protect the user from falling down and getting hurt due to that the running speed of the user does not compete with the rotation speed of the endless belt. As a result, in the sporting apparatus and control method thereof of the invention, the external power is not necessary and the user can be protected from falling down and getting hurt.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A sporting apparatus, which is capable of continuously outputting electricity, comprising:
   a structure body;
   an endless belt disposed on the structure body and rotated by kinetic energy by a user;
   an electricity generating unit disposed in the structure body and configured to transform kinetic energy transmitted from the endless belt into electric power;
   a position sensing unit disposed in the structure body and configured to sense a position of the user on the endless belt so as to generate a sensing signal; and
   a modulation unit electrically connected with the electricity generating unit and the position sensing unit for receiving the sensing signal;
   wherein, the modulation unit comprises a DC/AC inverter, a current sensing element, an inductor and a semiconductor switch with a controller, the current sensing element is configured to sense an armature current outputted from the electricity generating unit and output a signal to the controller, and the controller is configured to control the duty ratio of the semiconductor switch to control the armature current, so that a counter torque of the electricity generating unit is adjusted when the armature current is adjusted according to the sensing signal for controlling the rotation speed of the endless belt.

2. The sporting apparatus according to claim 1, further comprising:
   a transmission mechanism disposed in the structure body and connected with the endless belt and the electricity generating unit.

3. The sporting apparatus according to claim 1, wherein when the current sensing element senses the armature current flowing through the inductor, the controller controls the duty ratio of the semiconductor switch to control the armature current.

4. The sporting apparatus according to claim 1, wherein when the current sensing element senses the current flowing through the conducted semiconductor switch, the controller controls the duty ratio of the semiconductor switch to control the armature current.

5. The sporting apparatus according to claim 1, wherein the modulation unit adjusts the armature current according to the sensing signal for changing the rotation speed of the endless belt, so that the user is kept on a specific position of the endless belt.

6. The sporting apparatus according to claim 1, wherein the modulation unit controls the armature current by pulse width modulation.

7. The sporting apparatus according to claim 1, further comprising:
   at least a piezo-electric element disposed in the endless belt.

8. The sporting apparatus according to claim 1, further comprising:
   a start auxiliary unit electrically connected with the electricity generating unit, wherein the start auxiliary unit provides a start voltage.

9. A control method applied to a sporting apparatus, wherein the sporting apparatus comprises an endless belt rotated by kinetic energy by a user, and the endless belt rotates to drive an electricity generating unit to generate an armature current, the method comprising the following steps of:
   sensing a position of the user on the endless belt so as to generate a sensing signal;
   adjusting the armature current according to the sensing signal to adjust a counter torque of the electricity generating unit; and
   controlling a rotation speed of the endless belt according to the adjusted armature current.

10. The method according to claim 9, wherein the step of adjusting the armature current according to the sensing signal is performed by a modulation unit.

11. The method according to claim 10, wherein the modulation unit controls the armature current by pulse width modulation.

12. The method according to claim 10, wherein the modulation unit controls the armature current by modulating an output power of the electricity generating unit.

13. The method according to claim 10, wherein the modulation unit alters the armature current so as to change the rotation speed of the endless belt, so that the user is kept on a specific position of the endless belt.

14. The method according to claim 9, wherein the step of sensing the position of the user on the endless belt so as to generate the sensing signal is performed by a position sensing unit.

15. The method according to claim 9, wherein when the al nature current decreases, the rotation speed of the endless belt increases.

16. The method according to claim 9, wherein when the armature current increases, the rotation speed of the endless belt decreases.

\* \* \* \* \*